(12) United States Patent

Shah

(10) Patent No.: US 8,966,318 B1
(45) Date of Patent: Feb. 24, 2015

(54) METHOD TO VALIDATE AVAILABILITY OF APPLICATIONS WITHIN A BACKUP IMAGE

(75) Inventor: Amrish Shah, Pune (IN)

(73) Assignee: Symantec Corporation, Mountain View, CA (US)

( * ) Notice: Subject to any disclaimer, the term of this patent is extended or adjusted under 35 U.S.C. 154(b) by 257 days.

(21) Appl. No.: 13/458,155

(22) Filed: Apr. 27, 2012

(51) Int. Cl.
*G06F 11/00* (2006.01)

(52) U.S. Cl.
USPC .............................. 714/41; 714/28

(58) Field of Classification Search
CPC ............ G06F 11/1446; G06F 11/1448; G06F 11/1453; G06F 11/1458; G06F 11/1464; G06F 11/1469
USPC ............................. 714/28, 37, 38.1, 38.11, 41
See application file for complete search history.

(56) References Cited

U.S. PATENT DOCUMENTS

| 8,621,274 | B1 * | 12/2013 | Forgette et al. ................. 714/10 |
| 2009/0222496 | A1 * | 9/2009 | Liu et al. ........................ 707/204 |
| 2010/0005258 | A1 * | 1/2010 | Westenberg .................... 711/162 |
| 2011/0087874 | A1 * | 4/2011 | Timashev et al. .............. 713/100 |
| 2012/0324183 | A1 * | 12/2012 | Chiruvolu et al. ............. 711/162 |
| 2013/0185716 | A1 * | 7/2013 | Yin et al. ........................... 718/1 |
| 2013/0232245 | A1 * | 9/2013 | Antosz et al. .................. 709/222 |
| 2013/0246360 | A1 * | 9/2013 | Ngo ............................... 707/639 |

* cited by examiner

*Primary Examiner* — Joshua Lohn
(74) *Attorney, Agent, or Firm* — Campbell Stephenson LLP

(57) ABSTRACT

A health services module can test availability of one or more applications installed in a virtual machine that is instantiated from a backup image of a virtual machine disk file. A health services module can be installed on a virtual machine to test one or more applications that a user wishes to validate. If the health services module indicates that the application(s) of the virtual machine are available, a guarantee of availability can be provided for the backup image of the virtual machine disk file. If the health services module indicates that the application(s) of the virtual machine are unavailable, no guarantee of availability can be given. The guarantee of availability can indicate that the backup image of the virtual machine disk file can be successfully restored, and that the application(s) of the virtual machine instantiated from the backup image are available to respond to a client request.

20 Claims, 6 Drawing Sheets

METHOD TO VALIDATE AVAILABILITY OF APPLICATIONS WITHIN A BACKUP IMAGE

FIELD OF THE INVENTION

This invention relates generally to application availability and, more particularly, to application availability within a backup image.

DESCRIPTION OF THE RELATED ART

Businesses can provide application services to clients, where an available application service can respond to client requests. However, an application service can suffer an error or failure during operation and may be offline or unavailable when a client needs to submit a client request to the application service. Issues that may affect an application service and result in reduced availability of the application service can include corruption of the underlying data files used to provide the application service.

SUMMARY OF THE INVENTION

A health services module can test availability of one or more applications installed in a virtual machine that is instantiated from a backup image of a virtual machine disk file. A health services module can be installed on a virtual machine to test one or more applications that a user wishes to validate. If the health services module indicates that the application(s) of the virtual machine are available, a guarantee of availability can be provided for the backup image of the virtual machine disk file. If the health services module indicates that the application(s) of the virtual machine are unavailable, no guarantee of availability can be given. The guarantee of availability can indicate that the backup image of the virtual machine disk file can be successfully restored, and that the application(s) of the virtual machine instantiated from the backup image are available to respond to a client request. Thus, an administrator that instantiates a virtual machine from a backup image with a guarantee of availability can trust that the virtual machine will likely be available to respond to client requests. An administrator can also avoid instantiating a virtual machine from a backup image without such a guarantee, since the virtual machine will likely be unavailable to respond to client requests.

BRIEF DESCRIPTION OF THE DRAWINGS

The present invention may be better understood, and its numerous objects, features and advantages made apparent to those skilled in the art, by referencing the accompanying drawings.

Figure 1:
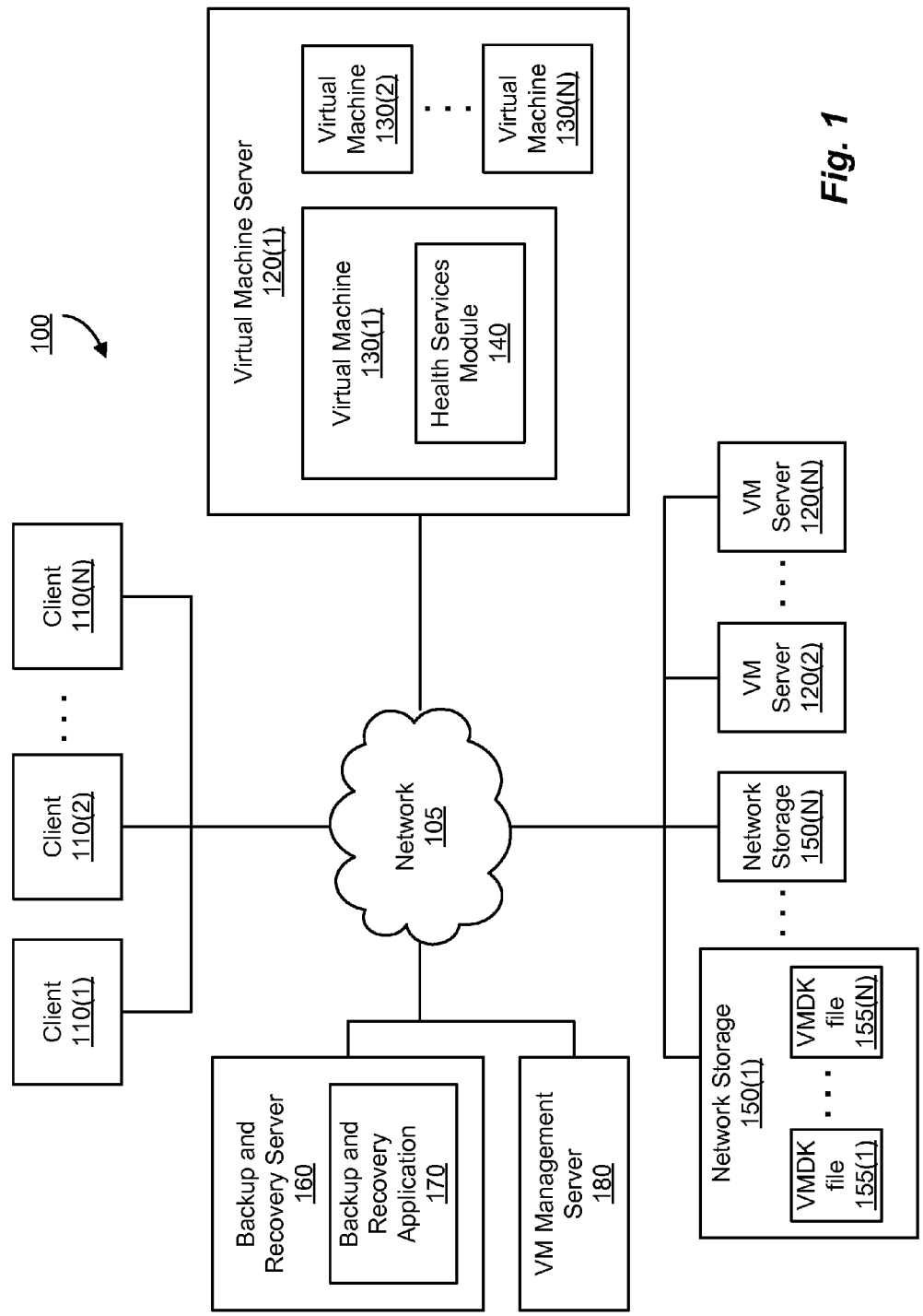
FIG. 1 is a block diagram illustrating components of an example virtualization system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

FIG. 1 is a block diagram illustrating components of an example virtualization system 100, in which the present disclosure can be implemented. Virtualization system 100 includes a network 105 that communicatively couples one or more client devices 110(1)-(N), one or more virtual machine (VM) servers 120(1)-(N), one or more network storage devices 150(1)-(N), a backup and recovery server 160, and a virtual machine management server 180. Each component is discussed in further detail below.

One or more client devices 110(1)-(N), also referred to herein as client systems and/or clients, can be implemented using, for example, a desktop computer, a laptop computer, a workstation, a server, or the like. An example of such computing devices is described subsequently, in connection with FIG. 5. One or more clients 110(1)-(N) can be configured to access one or more virtual machines 130(1)-(N) on virtual machine servers 120(1)-(N) via network 105. An example of network 105, which can be used by clients 110(1)-(N) to access the virtual machines 130(1)-(N) on VM servers 120(1)-(N), is a local area network (LAN) utilizing Ethernet, IEEE 802.11x, or some other communications protocol. As will be appreciated, storage devices 150(1)-(N) can also be accessed by clients coupled directly thereto (not shown).

One or more virtual machines 130(1)-(N), referred to generally herein as a virtual machine or VM 130, can be execute on one or more virtual machine servers 120(1)-(N), referred to generally herein as a VM server 120. A virtual machine server 120 can be a physical server on which virtual machines are instantiated. A virtual machine 130 can be a software implementation of a physical machine (e.g., computer), where a virtual machine can execute its own operating system (OS) and applications as if it were a physical machine.

Like a physical machine, the contents and structure of a virtual machine can be contained in a software container, also referred to herein as a virtual machine (VM) disk image. A VM disk image can be a single file that contains the complete contents and structure of the virtual machine, thus representing the hard disk drive of the virtual machine. A VM disk image can be stored in a virtual machine disk (VMDK) file format, also referred to herein as a VMDK image, a VMDK image file, or a VMDK file. VMDK files 155(1)-(N) can be stored in network storage 150 (e.g., backend storage). Each VMDK file 155 can be installed and executed on one or more VM servers 120(1)-(N). A VMDK file can be used to provision hundreds of virtual machines, where a virtual machine can be instantiated using the VMDK file.

Each VM server 120 can include a virtual machine manager, also known as a hypervisor, to manage the execution of the virtual machines 130(1)-(N) on a VM server 120. Multiple virtual machines can be instantiated on a VM server, and those virtual machines can share the resources of the VM server. However, virtual machines are tightly isolated on a VM server, meaning that the software running inside a virtual machine can be limited to the resources and abstractions defined within the virtual machine.

One or more network storage devices 150(1)-(N), also referred to generally herein as storage device 150 or network storage 150, can provide backend storage for VMDK files 155(1)-(N) of virtual machines 130(1)-(N). Each storage device 150 can have a file system that can be responsible for organizing and managing files and folder on a network storage device. Network storage 150 can be implemented as network attached storage (NAS), file servers, storage filers, and/or other shared network devices (also referred to herein as network shares). Network storage can be implemented as a single storage device or as a collection of storage devices. Network storage can also be implemented as a storage area network (SAN), which couples remote storage devices to a server (e.g., a storage server), such that the remote storage devices appear as locally-attached storage devices to the server's OS, for example. Network storage can include a data volume.

Virtual machine (VM) management server 180 can provide management services for virtual machines in virtualization system 100. Examples of a VM management server 180 include VMware™ vSphere (available from VMware, Inc., of Palo Alto, Calif.) which provide management services for virtual machines, as well as other third-party vendor solutions. VM management server 180 can instantiate, support, and control virtual machines and can provide client access to virtual machines in virtualization system 100.

While not shown, a virtual machine (VM) cluster server can be provided in virtualization system 100 to provide clustering services for virtual machines in virtualization system 100. Examples of a VM cluster server include Veritas™ Cluster Server (VCS, available from VMware, Inc., of Palo Alto, Calif.), as well as other third-party vendor solutions. VM cluster server can manage a cluster, or group of computing nodes, where a virtual machine 130 can be instantiated on different nodes of the cluster. The redundancy provided by the cluster ensures availability of the virtual machine 130, where availability refers to the ability of clients 110 to access the virtual machine 130 in the virtualization system 100, and that the virtual machine 130 is able to respond to client requests. For example, if an instance of a virtual machine 130 on a primary node of a cluster fails or otherwise becomes unavailable, VM cluster server can detect the failure and can take steps to restore the virtual machine. VM cluster server can restart the virtual machine 130 on the same node (via a VM cluster module located on the node), or can move the virtual machine to a secondary node in the cluster (e.g., installing the VMDK file of the virtual machine to the secondary node) and start the virtual machine on the secondary node.

A backup and recovery application 170, which can be located on a backup and recovery server 160, can provide backup and recovery services for virtual and physical machines in the virtualization system 100. For example, a backup and recovery application 170 can back up a virtual machine by implementing a backup process that creates a backup image of a VMDK file of the virtual machine. Backup and recovery application can store backup VMDK files in network storage 150 (e.g., backend storage), where VMDK files 155(1)-(N) stored on network storage 150 can include one or more backup VMDK files, which can also be referred to herein as a backup VMDK file 155. A user can specify details for implementing a backup process, such as a list of VMDK files to be backed up by the backup process. A backup process can be automatically initiated, without user intervention, by a backup and recovery application 170 (according to a schedule previously provided by the user) or can be initiated by a user. Examples of a backup and recovery application 170 include Symantec™ Backup Exec available from Symantec Corporation of Mountain View, Calif., as well as other third-party vendor solutions. A backup and recovery application 170 can be implemented as a client-server application, with a server component (not shown) residing on a backup and recovery server 160 and a client component (not shown) residing on a client 110. A server component is configured to communicate with a client component during backup and restore processes.

A backup and recovery application 170 can also restore a backup image of a VMDK file, also referred to herein as a backup VMDK file. For example, a virtual machine 130 that is running on a cluster node (where the VMDK file of the virtual machine is installed on the cluster node) in virtualization system 100 may suffer a failure. In response, the backup and recovery application 170 can restore the latest backup image of the virtual machine's VMDK file to the cluster node and re-instantiate the virtual machine from the restored backup image. However, a restored VMDK file is not necessarily free of corruption or other reason for failure. A VMDK file that is restored to a cluster node may fail to run on the cluster node, or a virtual machine that runs from the restored VMDK file on the cluster node may include an application that fails to respond to client requests. Thus, in order to ensure that a virtual machine and its applications will be available to clients, a backup image of the virtual machine should be tested to verify that the virtual machine can be successfully booted (e.g., started) from the restored backup image and that the applications of the virtual machine are available to a client, before the backup image is used to re-instantiate failed virtual machines in the virtualization system 100.

A backup and recovery application 170 can test a backup image of a VMDK file by performing a test restore operation, or by restoring a backup image to a test environment, such as a VM server 120, and verifying that a virtual machine can be instantiated or started from the backup VMDK file. To perform this verification, the VM server 120 can be configured as a single node cluster that serves as a test server in which a virtual machine 130 can be instantiated by installing a backup VMDK file 155 onto the (test) VM server 120 and booting, or starting, the virtual machine 130. If the virtual machine is successfully instantiated from a given backup VMDK file 155 (e.g., is running on the test VM server 120), the backup VMDK file is restorable and the backup and recovery application 170 can provide a guarantee of restorability for the backup VMDK file. If the virtual machine cannot be successfully instantiated from a given backup VMDK file, the backup VMDK file is not restorable, and the backup and recovery application 170 cannot provide a guarantee of restorability for the backup VMDK file. A guarantee of restorability is metadata about a backup VMDK file 155, indicating that the backup VMDK file 155 can be successfully restored. The backup and recovery application 170 can associate a guarantee of restorability with each backup VMDK file 155, and can store the guarantee of restorability with an associated backup VMDK file 155 in network storage 150. A guarantee of restorability can be a timestamp associated with a backup VMDK file indicating a time when the backup VMDK file was successfully tested to be restorable.

A guarantee of restorability can be provided to a user, directly or indirectly, via a graphical user interface (GUI), such as a health services user interface provided to a client device 110. For example, a guarantee of restorability can be provided via an icon or picture associated with a backup VMDK file name displayed in the health services user interface. A timestamp of the guarantee of restorability can also be provided in the health services user interface. If a backup VMDK file does not have a guarantee of restorability, the backup VMDK file name is not associated with any icon or picture. A guarantee of restorability can be used to identify backup images that can be used for restoration of virtual machines, or can be used to identify backup images that should be avoided when restoring virtual machines.

Although a backup VMDK file 155 can be restorable, one or more applications within the backup VMDK file (i.e., one or more applications 210 installed on the virtual machine 130) may not be available. For example, although a virtual machine can be running on a test server, an error or failure of an application and/or a resource used by the application may prevent the application from starting and/or from being available to respond to a client request. A health services module 140, described in more detail below with respect to FIG. 2, can be used to test the availability of applications 210 of the virtual machine 130 and ensure that the applications can start and can respond to a client request. Backup and recovery application 170 can install a health services module 140 on each running virtual machine (instantiated from a backup VMDK file) that the backup and recovery application 170 wishes to validate (i.e., wishes to test the applications of the virtual machine). If the health services module 140 indicates that the applications of the virtual machine are available, the backup and recovery application 170 can provide a guarantee of availability for the (restorable) backup VMDK file of the virtual machine 130. If the health services module 140 indicates that the applications 210 of the virtual machine are unavailable, the backup and recovery application 170 cannot provide a guarantee of availability for the backup VMDK file.

A guarantee of availability is metadata about a backup VMDK file 155, indicating that the applications 210 of the virtual machine 130 instantiated from the backup VMDK file are available to respond to a client request. Since the guarantee of availability can be provided for a backup VMDK file 155 once the backup VMDK file 155 has been determined to be successfully restorable, the guarantee of availability can also indicate that the backup VMDK file 155 can be successfully restored. The backup and recovery application 170 can associate a guarantee of availability with each backup VMDK file 155, and can store the guarantee of availability with an associated backup VMDK file 155 in network storage 150. A guarantee of availability can be a timestamp associated with a backup VMDK file indicating a time when the backup VMDK file was successfully tested to be available. A guarantee of availability can be provided to a user, directly or indirectly, via a graphical user interface (GUI), such as a health services user interface provided to a client device 110. For example, a guarantee of availability can be provided via an icon or picture associated with a backup VMDK file name displayed in the health services user interface, or can be provided by displaying the backup VMDK file name in green. A timestamp of the guarantee of availability can also be provided in the health services user interface. If a backup VMDK file does not have a guarantee of availability, the backup VMDK file name is not associated with any icon or picture, or the backup VMDK file name can be displayed in red. A guarantee of availability can be used to identify preferred backup images that should be used for restoration of virtual machines, or can be used to identify backup images that should be avoided when restoring virtual machines.

In light of the present disclosure, it will be appreciated that network storage 150 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, virtualization system 100 and network 105 can include other components such as routers, firewalls and the like that are not germane to the discussion of the present disclosure and will not be discussed further herein. It will also be appreciated that other configurations are possible. For example, clients 110(1)-(N) can be directly coupled to VM servers 120(1)-(N) and/or network storage 150(1)-(N), and so on.

The letter N is used to indicate a variable number of devices or components. For example, a variable number of clients, VM servers, and network storage are implemented in the storage system. Although the letter N is used in describing a variable number of instances of each of these different devices and components, a repeated use of the letter N does not necessarily indicate that each device and component has a same number of N instances implemented in the virtualization system.

Figure 2:
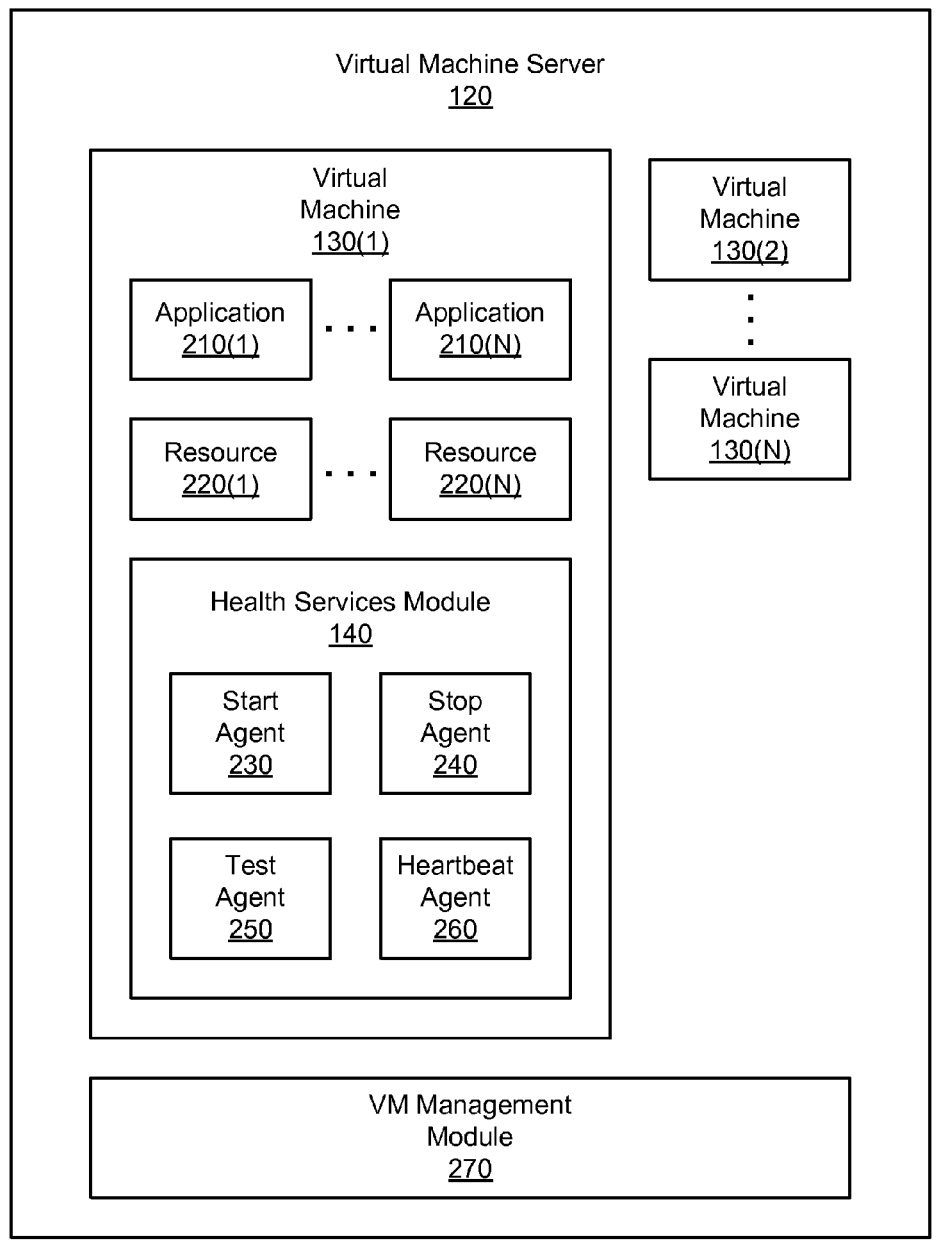
FIG. 2 is a block diagram illustrating components of a restore test environment in which a health services module can be implemented, according to one embodiment.

FIG. 2 is a block diagram illustrating components of a restore test environment, such as virtual machine (VM) server 120, in which a health services module 140 can be implemented. A backup and recovery application 170 can validate a backup image of a VMDK file 155 by performing a test restore operation, or by restoring a backup image to a test environment, such as VM server 120, and verifying that a virtual machine can be instantiated or started from the backup VMDK file. VM server 120 can be configured as a single node cluster that serves as a test server in which a virtual machine 130 can be instantiated by installing a backup VMDK file 155 onto the (test) VM server 120 and booting, or starting, the virtual machine from the backup VMDK file 155. Multiple virtual machines 130(1)-(N) can be instantiated in the test environment (e.g., running on the test VM server 120). Each virtual machine 130 can include one or more applications 210(1)-(N) and one or more resources 220(1)-(N). While applications 210(1)-(N) are shown as discrete standalone application programs, applications 210(1)-(N) can also include multiple application components that work cooperatively to provide an application service. One or more applications 210(1)-(N) can also use one or more resources 220(1)-(N).

Once a virtual machine 130 is instantiated and running, the backup and recovery application 170 can complete validation of the backup VMDK file 155 by installing a health services module 140 in the virtual machine 130 to test availability of one or more applications 210 of the virtual machine (e.g., to test whether an application can successfully respond to a client request). A separate instance of a health services module can be installed on each of multiple virtual machines 130(1)-(N) running on the test VM server 120. Examples of a health services module include modules that provide health services functionality such as those available in Symantec™ ApplicationHA (High Availability) products available from Symantec Corporation, of Mountain View, Calif., as well as other third-party vendor solutions.

In one embodiment, a health services module 140 can communicate with VM management server 180 via a plug-in or software component that serves as an interface between the health services module 140 and the VM management server 180, where the plug-in enables the VM management server 180 to generate and/or display a health services user interface at a client device 110. Backup and recovery application 170 can also communicate with the VM management server 180 via a plug-in or software component that serves as an interface between the backup and recovery application 170 and the VM management server 180. Since both health services module 140 and backup and recovery application 170 can communicate with VM management server 180, backup and recovery application 170 can also receive information sent from health services module 140 via VM management server 180. In an alternative embodiment, a health services module 140 can communicate directly with the backup and recovery application 170 via a plug-in or software component that serves as an interface between the health services module 140 and the backup and recovery application 170, where the plug-in enables the backup and recovery application 170 to generate and/or display a health services user interface at the client device 110. Backup and recovery application can also be configured to listen for, or snoop, messages transmitted between VM management server 180 and a VM management module 270 on VM server 120, and/or between VM management server 180 and health services module 140, which may be sent via a messaging system, such as Veritas Storage Foundation Messaging Service, available from Symantec Corporation of Mountain View, Calif. A health services module 140 can also be provided by off-the-shelf health services software, such as Symantec™ ApplicationHA products, and can be configured to communicate with VM management server 180 and/or backup and recovery application 170 via the above-discussed plug-in or software component.

The health services user interface can be used by a user (e.g., a backup administrator) to configure a testing process implemented by a health services module 140 to evaluate availability of one or more applications 210 of a virtual machine 130. The testing process determines whether the one or more applications 210 are able to respond to client requests and thus are able to provide an application service to clients. Testing availability of an application is also referred to herein as testing availability of an application service provided, in whole or in part, by the application. A user can enter configuration information, modify existing configuration information, and remove configuration information via the health services user interface. Configuration information can specify one or more application services (e.g., application services that are important and/or mission-critical for the user and/or the user's business) that should be tested for availability, via the health services user interface.

A user can identify an application service by defining an application service group associated with the application service that the user wishes to test for availability. An application service group acts as a container for all the necessary resources of an application used to provide an application service, which are managed as a single unit or set of resources. An application service group definition can include a name of the application service group, a definition of resources included in the application service group (which can include an application program and/or components), any dependencies between resources included in the application service group, and attributes of the application service group. For example, an application service group can include an application program and/or components 210(1)-(N) and one or more additional resources 220(1)-(N), such as associated code libraries, a database or other data store containing application data, one or more network shares, one or more storage mount points, one or more network interface cards used to communicate with a client, and one or more IP addresses associated with the network interface card(s).

Resources 220 can also be grouped into resource groups, where an application service group can include one or more resource groups. Dependencies can be defined between resources, between resource groups, and any combination thereof. Dependencies can be taken into account when bringing resources online (e.g., starting one or more resources) or taking resources offline (e.g., stopping one or more resources). For example, if a first resource group cannot be brought online unless a second resource group has already been successfully started, the first resource group is considered dependent on the second resource group.

Configuration information can also include testing parameters for implementing a testing process to evaluate availability of an application service. The testing parameters are configurable by a user, and can include a start timeout period, a number of restart attempts, a heartbeat time interval, and a testing timeout period, which are further discussed below. If multiple application service groups of a virtual machine 130 are specified to be tested, the testing parameter values can apply to all application service groups being tested on the virtual machine 130. Configuration information, once entered by a user, can be stored at a VM management server 180 and/or a backup and recovery server 160.

Once the testing process is configured (e.g., the application service groups and testing parameters are configured), health services module 140 can test one or more application services using various agents of the health services module that cooperatively implement the testing process. A health services module 140 can include a start agent 230, a stop agent 240, a test agent 250 and a heartbeat agent 260. When an agent is initiated or triggered, the agent can obtain the configuration information from the VM management server 180 and/or the backup and recovery server 160. Health services module 140 can provide processing logic for coordinating and triggering the agents automatically, without user intervention.

Once a health services module 140 is installed on a virtual machine 130, health services module 140 can initiate the testing process by triggering start agent 230 to start one or more applications that provide an application service identified by the user for testing. Start agent 230 is configured to start an application by invoking a start procedure for each resource included in the application service group associated with the identified application service, where the start procedures for the resources can be invoked in an order required by existing resource dependencies. Each resource of an application service group, such as an application program 210 and a resource 220 of virtual machine 130, can have its own start procedure. A start procedure for a resource can be predefined (e.g., included in a code library associated with an application service) or can be defined using custom scripts written for the resource. Start agent 230 can also be configured to start resources of one or more application service groups sequentially or in parallel, or in some combination thereof. In one embodiment, if the resources of one or more application service groups are started in parallel, a different instance of a start agent 230 can be associated with each of the application service groups, where each start agent instance can start the resources of the application service group associated with that particular start agent instance.

A start timeout period can be used to determine whether an application is successfully started and provides an application service. A start timeout period can be configured by a user, and defines the amount of time (e.g., in terms of number of seconds) that the start agent should wait for an application to start, after start agent 230 invokes a start procedure of the application service group (e.g., invokes a first start procedure of multiple resource start procedures). In one embodiment, a start timeout period can be configured for an amount of time in seconds. An example start timeout period can range between 0 to 600 seconds, with 300 seconds as an example default value. Since other parameters can affect the application response time, such as workload, system performance, and network bandwidth, a start timeout period can be lengthened or shortened accordingly to account for a longer or shorter application response time.

A restart attempt value can also be used to determine whether an application should be restarted. Restart attempt value defines the number of times that start agent 230 should try to start an application. If an application fails to start (e.g., the application fails to respond, and/or returns an error) within the start timeout period, start agent 230 can restart the application (e.g., invoke the start procedure(s) for the application again), according to the restart attempt value. A restart attempt value can be configured for a number of restart attempts. An example restart attempt value can range between 0 to 6 attempts, with 1 attempt as an example default value. For example, a restart attempt value of 0 would indicate that start agent 230 should not attempt to restart the application if the application does not start within the start timeout period. A restart attempt value of 2 would indicate that start agent 230 should attempt to restart the application up to two times if the application does not start within the initial start timeout period.

Start agent 230 can indicate a status of the application service, based on whether the application has successfully started or not. If the application is successfully started and running on the test VM server 120 within the specified number of restart attempts, the start agent 230 can determine that the application service is online and running on the test VM server 120, and can indicate that an application status of the application service is healthy. If the application does not start within the specified number of restart attempts and no application service is running, start agent 230 can determine that the application service is offline, and can indicate that an application status of the application service is unhealthy.

When health services module 140 triggers start agent 230 to start an application, health services module 140 can also trigger heartbeat agent 260 to begin sending an application heartbeat. Heartbeat agent 260 is configured to implement an application heartbeat that is used to communicate application status to the VM management server 180 and (directly or indirectly) to backup and recovery application 170. A heartbeat interval can be configured by a user, and defines the number of seconds within which the heartbeat agent should send a heartbeat message. The heartbeat interval resets after each heartbeat is sent. Heartbeat agent 260 can convey a healthy application status (e.g., the application service is online and running) to the VM management server 180 by transmitting a continuing stream of heartbeat messages, with each heartbeat message sent within the heartbeat interval (e.g., each heartbeat is sent within a given number of seconds of each other). Heartbeat agent 260 can convey an unhealthy application status (e.g., the application service is offline) by stopping transmission of the heartbeat messages. VM management server 180 can be notified that one of the application services of the virtual machine has unhealthy status when the VM management server 180 fails to receive a heartbeat message for the application service within a heartbeat interval.

Heartbeat agent 260 can convey application status as the status is determined by the start agent 230 (and also by the test agent 250, as discussed further below). Heartbeat agent 260 can obtain the status from the start agent 230 (e.g., reading a status value generated by the start agent) and can convey a healthy application status by continuing to send heartbeat messages, also referred to herein as simply a heartbeat, to VM management server 180. Backup and recovery application 170 can be notified of the healthy application status of the one or more applications of a virtual machine (which are thus presently available) by receiving a heartbeat within a heartbeat interval (e.g., receiving a stream of heartbeat messages). Backup and recovery application 170 can receive a heartbeat indirectly by listening for the heartbeat transmitted to VM management server 180, or can receive the heartbeat directly from VM management server 180, if backup and recovery application 170 is configured to communicate with VM management server 180. In one embodiment, heartbeat agent 260 can convey a heartbeat message to a VM management module 270 located on VM server 120, which can be configured to convey the heartbeat message to VM management server 180.

Heartbeat agent 260 can also obtain the status from the start agent 230 (e.g., read a status value provided by the start agent 230) and convey an unhealthy application status by stopping the heartbeat. Backup and recovery application 170 can be notified of the unhealthy application status of the one or more applications of a virtual machine (which are thus not available) by failing to receive a heartbeat within a heartbeat interval. Backup and recovery application 170 can stop receiving a heartbeat within a heartbeat interval, either directly (e.g., detects that a heartbeat message has not been received from VM management server 180) or indirectly (e.g., detects that a heartbeat message has not been sent to VM management server 180).

VM management module 270 can also be configured to restart the virtual machine 130 if VM management module 270 stops receiving the heartbeat. Thus, after the health services module 140 has attempted to restart the application for the number of specified restart attempts, the VM management module 270 can restart the virtual machine. Backup and recovery application 170 can also determine that one or more applications of a virtual machine have failed (and thus are not available) by listening for communication between the VM management module 270 and VM management server 180 about restarting the virtual machine 130.

The health services user interface can also be configured to display the application status of one or more application services being tested. Application status can be displayed in the health services user interface and can be refreshed periodically, such as every 60 seconds by default. Application status can be displayed as healthy (e.g., the application service is running on the virtual machine) or as unhealthy (e.g., the application service is not running on the virtual machine and/or has failed). In one embodiment, if multiple application services are being tested in parallel, a different instance of a heartbeat agent 260 can be associated with each of the application services, where each heartbeat agent instance can send a heartbeat for the application service associated with the heartbeat agent instance. In an alternative embodiment, a single heartbeat is provided as conveying a summary status of all application services of a virtual machine. Thus, in this embodiment, unavailability of one application service, regardless of whether the other application services are available, will stop the heartbeat.

If an application service is determined to be failed (e.g., one or more of the resources or application program of an application service group cannot be successfully started and is offline), then unhealthy application status is communicated via lack of the heartbeat, and the application status for the application service is displayed as unhealthy (e.g., the application service is not running on the virtual machine). The health services user interface can also be configured to display a status of the virtual machine 130 (e.g., online if the virtual machine is running on the test VM server 120, and offline if the virtual machine is stopped or no longer running on the test VM server 120).

Backup and recovery application 170 can be notified that the application service is available (e.g., has a healthy status) or unavailable (e.g., has an unhealthy status) via the heartbeat associated with the application service. In response to an unhealthy status (e.g., a heartbeat has not been received by backup and recovery application 170 within a heartbeat interval), backup and recovery application can determine that the backup VMDK file 155 that includes the application service cannot be given a guarantee of availability. In one embodiment, if a single heartbeat is provided to convey a summary status of all application services of a virtual machine 130, stopping the heartbeat will effectively communicate to backup and recovery application 170 that at least one of the application services is unavailable. Backup and recovery application 170 can determine that the backup VMDK file 155 that contains the unavailable application service(s) cannot be given a guarantee of availability. In response to a healthy status (e.g., a heartbeat has been received by backup and recovery application 170 within a heartbeat interval), backup and recovery application 170 can continue to wait for the health services module 140 to complete the testing process, which is further discussed below.

Once the application service is successfully started and running on the test VM server 120, health service module 140 can trigger test agent 250 to test the one or more application services. Test agent 250 is configured to test an application service for availability by invoking a test procedure for the application service. Each resource of an application service group associated with the application service being tested, such as application program 210 and resource 220 of virtual machine 130, can have its own test procedure component, meaning the resources of the application service group can perform different test components of a single test procedure to evaluate the availability of the application service. A test procedure and/or test procedure component can be predefined (e.g., included in a code library associated with an application service) or can be defined using custom scripts written for the resource. Test agent 250 can also be configured to test one or more application services sequentially or in parallel. In one embodiment, if the one or more application services are tested in parallel, a different instance of a test agent 250 can be associated with each of the application services, where each test agent instance can test the resources of the application service group associated with the test agent instance.

Test agent 250 determines if the specified application service is available by implementing test procedures that includes requests similar to typical client requests sent to the application service. A test procedure can include certain commands, tests, or scripts that are similar to commands, tests, or scripts that would be submitted to an application service by a client. A test procedure that closely matches client requests can better discover possible availability problems. For example, if an application service often receives client read and write requests for a database, a test procedure may involve read and write requests directed to the database, in order to verify read and write access to the database (e.g., to verify that the application service can connect to the database and can successfully read from, and write to, the database).

A testing timeout period can be used to determine whether an application service has completed testing. A testing timeout period is configurable by a user. In one embodiment, a testing timeout period defines the number of seconds that the test agent 250 should wait for an application service to complete the test procedure (e.g., perform a request of the test procedure), after test agent 250 invokes a test procedure for the application service group. The testing timeout period provides enough time for the test agent 250 to determine a status for the application service (which includes enough time within which a healthy application service should successfully complete the test procedure), and for the heartbeat agent 260 to report a status for the application service. A testing timeout period can be configured for an amount of time in seconds. An example testing timeout period can range between 0 to 1200 seconds, with 600 seconds as an example default value. Since other parameters can affect application performance time, such as workload, system performance, and network bandwidth, the testing timeout period can be lengthened or shortened accordingly to account for a longer or shorter application performance time.

Test agent 250 can indicate a status of the application service, based on whether the application service has successfully completed the test procedure or not. If the application service has successfully performed the test procedure (e.g., application service successfully accesses and writes to a database, or results returned from the application service match baseline results) within the testing timeout period, the test agent 250 can determine that the application service is available for client requests, and can indicate that an application status of the application service is healthy. In one embodiment, test agent 250 can also send a confirmation message to backup and recovery application to confirm that all application services specified for testing have successfully completed the test procedure(s) and are available. If the application service does not successfully perform the test procedure within the testing timeout period, the test agent 250 can determine that the application service is not available for client requests, and can indicate that an application status of the application service is unhealthy.

If application services are being tested sequentially and the test procedure for a first application service is complete, health services module 140 can trigger stop agent 240 to stop the first application service. Stopping a tested application service can free up resources for another application service to use during testing, which can help prevent any false findings of unavailability (e.g., an application service fails to complete the test procedure within the testing timeout period because other application services are running on the virtual machine that affect the response time of the application service being tested). Stop agent 240 is configured to stop resources of an application service group running on the virtual machine by invoking a stop procedure for each resource included in the application service group, where the stop procedures for the resources can be invoked in an order required by the resource dependencies. Each resource of an application service group associated with the application service being tested, such as application program 210 and resource 220 of virtual machine 130, can have its own stop procedure. A stop procedure for an application service should close out all tasks of the associated application program, store data properly, and then exit. If the application is restarted (e.g., the start procedure is invoked), the associated application program should be able to start from the last known state. A stop procedure for a resource can be predefined (e.g., included in a code library associated with an application service) or can be defined using custom scripts written for the resource. Stop agent 240 can also be configured to stop resources of one or more application service groups sequentially or in parallel. In one embodiment, if the resources of one or more application service groups are stopped in parallel, a different instance of a stop agent 240 can be associated with each of the application service groups, where each stop agent instance can stop the resources of the application service group associated with the stop agent instance.

While health services module 140 performs the testing process, backup and recovery application 170 can wait for a validation processing time period, or an amount of time within which application service(s) of the virtual machine being validated should be determined available or unavailable. A validation processing time period can include the full amount of time for completion of the start procedure (e.g., the start timeout period multiplied by the configurable number of restart attempts) and the testing procedure (e.g., a testing timeout period) needed for each application service being tested. For example, if multiple application services of a virtual machine are being tested sequentially, the backup and recovery application 170 can wait for a validation processing time period equivalent to the full time for completion of the start procedure and testing procedure multiplied by the number of application services. If multiple application services are being tested in parallel, the backup and recovery application 170 can wait for a validation processing time period equivalent to the full time for completion of the start and testing procedures for a single application service. The validation processing time period can be calculated automatically, without user intervention, by the backup and recovery application 170, based on the testing parameters and/or other configuration information entered by a user in the health services user interface.

During the validation processing time period, backup and recovery application 170 can use the application status of the application service to determine if a guarantee can be associated with the backup VMDK file 155 of the virtual machine 130. If the backup and recovery application 170 receives an unhealthy status during the validation processing time period, the backup and recovery application 170 need not wait for the entire validation processing time period to elapse, and can determine that the backup VMDK file 155 cannot be given a guarantee of availability, in response to the unhealthy status. If the validation processing time period has elapsed and no unhealthy status has been received, backup and recovery application 170 can determine that the application services of the backup VMDK file 155 are available and can associate a guarantee of availability with the backup VMDK file 155. In one embodiment, backup and recovery application 170 can receive a confirmation message from health services module 140 indicating that all application services specified for testing have successfully completed the test procedure(s) and are available. If the backup and recovery application 170 receives a confirmation message during the validation processing time period, the backup and recovery application 170 need not wait for the entire validation processing time period to elapse, and can determine that the backup VMDK file can be given a guarantee of availability, in response to the confirmation message.

Once the validation processing time period has expired, backup and recovery application 170 can trigger removal of the virtual machine 130 from the test VM server 120 (e.g., shutdown and uninstall the backup VMDK file 155 of the virtual machine 130 from VM server 120). In one embodiment, backup and recovery application 170 can trigger removal of the virtual machine in response to receipt of a confirmation message indicating that all application services specified for testing have successfully completed the test procedure(s) and are available. If multiple backup VMDK files 155 are being tested sequentially, backup and recovery application 170 can install a second backup VMDK file after uninstalling a first tested backup VMDK file, and can repeat the backup image validation process for the second backup VMDK file.

A user of the health services user interface can be assigned user privileges by an administrator that authorize the user to perform certain health services operations, such as viewing application health status in the health services user interface, starting and stopping an application, and configuring a testing process implemented by the health services module. User privileges can also authorize a user to set or configure the number of restart attempts, a start timeout period for starting the application, and a heartbeat interval. For example, a guest can be assigned a right to view application status, an operator can be assigned a right to view application status and a right to stop and start an application, and an administrator can be assigned a right to view application status, a right to stop and start an application, and a right to configure the testing process performed by the health services module.

Figure 3:
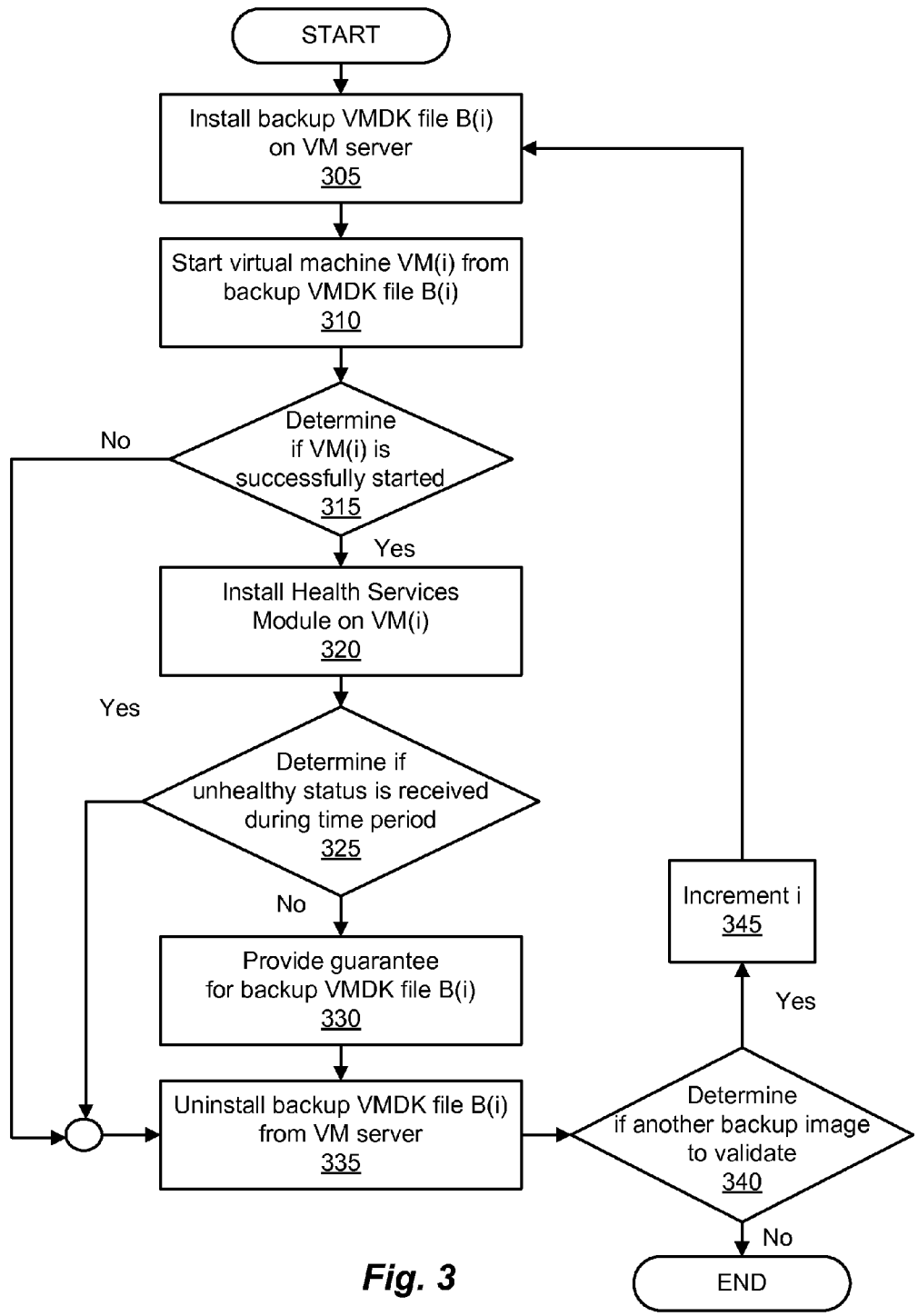
FIG. 3 is a flow chart illustrating acts of an example validation process implemented by a backup and recovery application, according to one embodiment.

FIG. 3 is a flow chart illustrating acts of an example validation process implemented by a backup and recovery application 170. The validation process determines whether one or more backup VMDK files (or backup images) can be restored, and whether applications of the backup VMDK files are available. The process of FIG. 3 begins at operation 305, installing a backup VMDK file B(i) on a VM server. A copy of backup VMDK file B(i) can be read from one VM server that provides backend storage of the backup VMDK file B(i), and the copy can be installed on (or restored to) a VM server that is configured as a test server. Operation 305 begins a process that will validate each backup VMDK file specified by a user. Thus, operations 305-340 can be repeated for each backup image that needs to be validated. A present iteration of the loop is indicated by the letter i, which can be initialized to one when the backup and recovery application begins the validation process of the backup VMDK files. At the end of each iteration, the letter i is incremented (e.g., operation 345), indicating that the next backup VMDK file can be validated (if there is another backup VMDK file to be validated).

The process of FIG. 3 proceeds to operation 310, starting a virtual machine VM(i) from backup VMDK file B(i). A virtual machine VM(i) can be started by booting up from the backup VMDK file B(i) installed on the VM server. The process of FIG. 3 proceeds to operation 315, determining if the virtual machine VM(i) is successfully started. If the virtual machine VM(i) is not successfully started, the process of FIG. 3 proceeds to operation 335, uninstalling backup VMDK file B(i) from VM server. Also, although not shown in FIG. 3, if the virtual machine VM(i) is not successfully started from backup VMDK file B(i), backup and recovery application can determine that the backup VMDK file B(i) is not restorable, and thus cannot provide a guarantee of restorability for the backup VMDK file B(i).

Returning to operation 315, if the virtual machine is successfully started and is running on the test server, the process of FIG. 3 proceeds to operation 320, installing health services module on VM(i). Also, although not shown in FIG. 3, if the virtual machine VM(i) is successfully started, backup and recovery application can determine that the backup VMDK file B(i) is restorable and thus can provide a guarantee of restorability for the backup VMDK file B(i).

Once the health services module is installed, backup and recovery application can initiate health services module to begin a testing process to validate the application services of the virtual machine VM(i). The process proceeds to operation 325, determining if unhealthy status is received during a validation processing time period. As discussed above, backup and recovery application can wait for the duration of the validation processing time period to receive an indication that application service(s) of the virtual machine VM(i) is unavailable. An indication that application service (s) is unavailable, or an unhealthy application status, can be conveyed to backup and recovery application via a heartbeat. If an unhealthy application status is received during the validation time period, the process proceeds to operation 335, uninstalling the backup VMDK file B(i) from VM server. If an unhealthy application status is not received during the validation time period, the process proceeds to operation 330, providing a guarantee of availability for the backup VMDK file B(i). The backup and recovery application can provide a guarantee of availability for the backup VMDK file B(i) because the health services module provided no indication of failure (e.g., a stopped heartbeat) of the application services running in the virtual machine VM(i) within the validation time period, and thus the application services are deemed to be available. The process then proceeds to operation 335, uninstalling backup VMDK file B(i) from VM server.

From operation 335, the process of FIG. 3 proceeds to operation 340, determining if another backup image needs to be validated. If another backup image (i.e., another backup VMDK file) needs to be validated, the process proceeds to operation 345, incrementing i, and returns to operation 305 to begin a new iteration for the next backup VMDK file. If another backup image does not need to be validated (i.e., all backup images have been through the validation process), the process ends.

Figure 4:
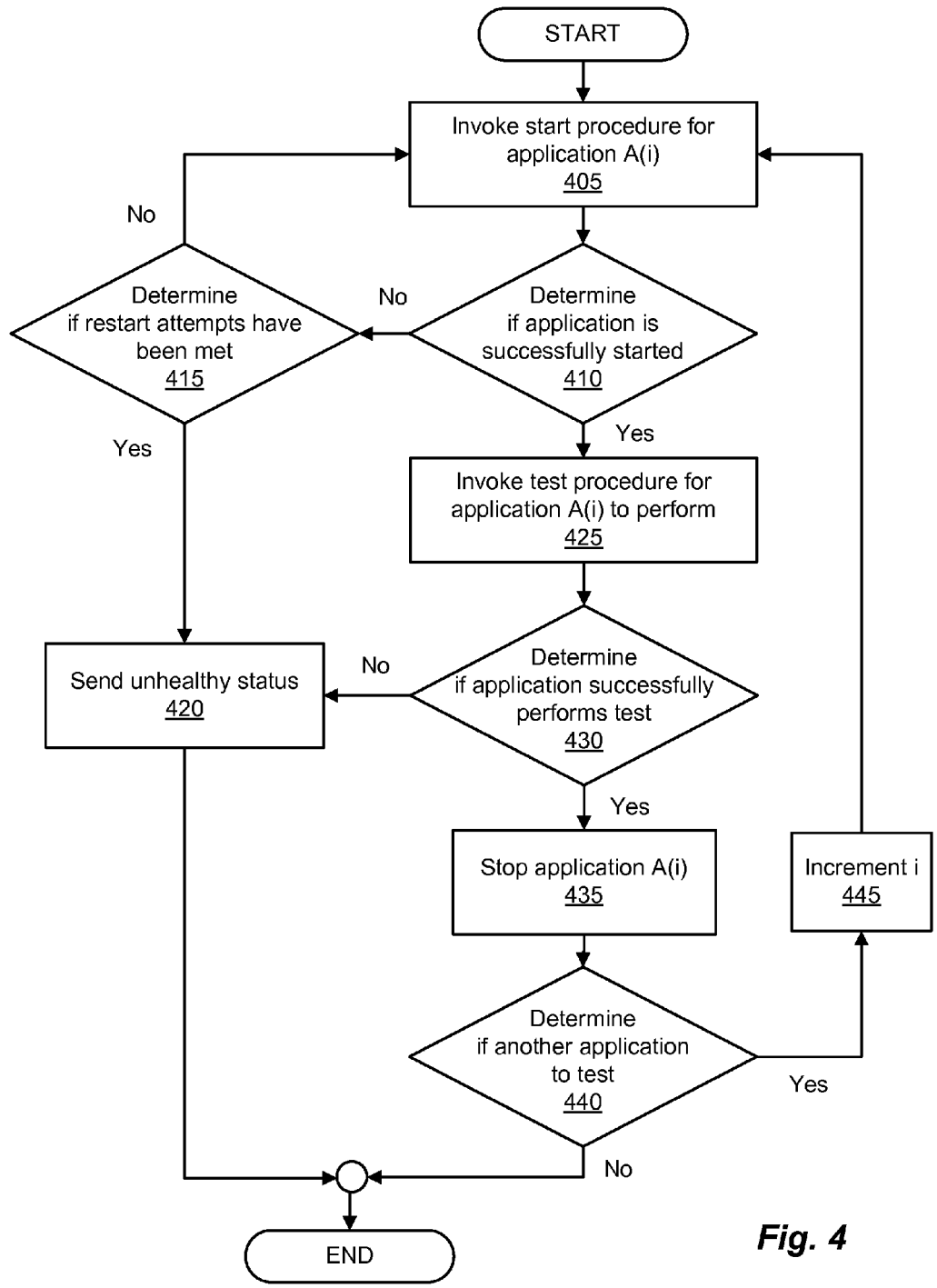
FIG. 4 is a flow chart illustrating acts of an example testing process implemented by a health services module, according to one embodiment.

FIG. 4 is a flow chart illustrating acts of an example testing process implemented by a health services module 140. The testing process tests the availability of one or more application services of a virtual machine, where the one or more application services are specified by a user to be tested. The process of FIG. 4 begins at operation 405, invoking a start procedure for application A(i). One or more start procedures can be invoked to start application A(i) (e.g., multiple start procedures to start resources and application program and/or components used by application A(i)). In one embodiment, operation 405 begins a process that will sequentially validate each application of a backup VMDK file, as specified by a user. Thus, operations 405-440 can be repeated for each backup image that needs to be validated. A present iteration of the loop is indicated by the letter i, which can be initialized to one when the health services module begins the testing process of the applications. At the end of each iteration, the letter i is incremented (e.g., operation 445), indicating that the next application can be tested (if there is another application to be tested). In another embodiment, an instance of the testing process of FIG. 4 can be implemented for each specified application in order to validate each specified application in parallel, where the instances of the testing process need not determine if additional applications within the virtual machine need to be tested.

The process of FIG. 4 proceeds to operation 410, determining if the application A(i) is successfully started. If the application is not successfully started, the process of FIG. 4 proceeds to operation 415, determining if the configured number of restart attempts has been met. If the configured number of restart attempts has not been met, the process returns to operation 405 to again invoke the start procedure for application A(i). If the configured number of restart attempts has been met, the process proceeds to operation 420, sending an indication that application service(s) of the virtual machine VM(i) is unavailable, such as unhealthy application status. As discussed above, stopping a heartbeat can convey unhealthy application status to backup and recovery application. The process then ends.

Returning to operation 410, if the application is successfully started, the process of FIG. 4 proceeds to operation 425, invoking a test procedure for application A(i) to perform. The process of FIG. 4 then proceeds to operation 430, determining if the application successfully performed the test. If the application did not successfully perform the test, such as failing to complete the test within a testing timeout period or returned an error during performance of the test, the process can proceed to operation 420, sending an indication that application service(s) of the virtual machine VM(i) is unavailable (e.g., such as an unhealthy application status by stopping a heartbeat) to backup and recovery application, and the process ends.

If the application successfully performed the test, the process of FIG. 4 proceeds to operation 435, stopping the application A(i). Since more than one application of a virtual machine can be tested, stopping the application can free up resources for testing the other applications. The process then proceeds to operation, 440, determining if another application needs to be tested. If another application needs to be tested, the process proceeds to operation 445, incrementing i, and returns to operation 405 to begin a new iteration for the next application. If another application does not need to be tested (i.e., all specified applications have been through the testing process), the process ends.

Figure 5:
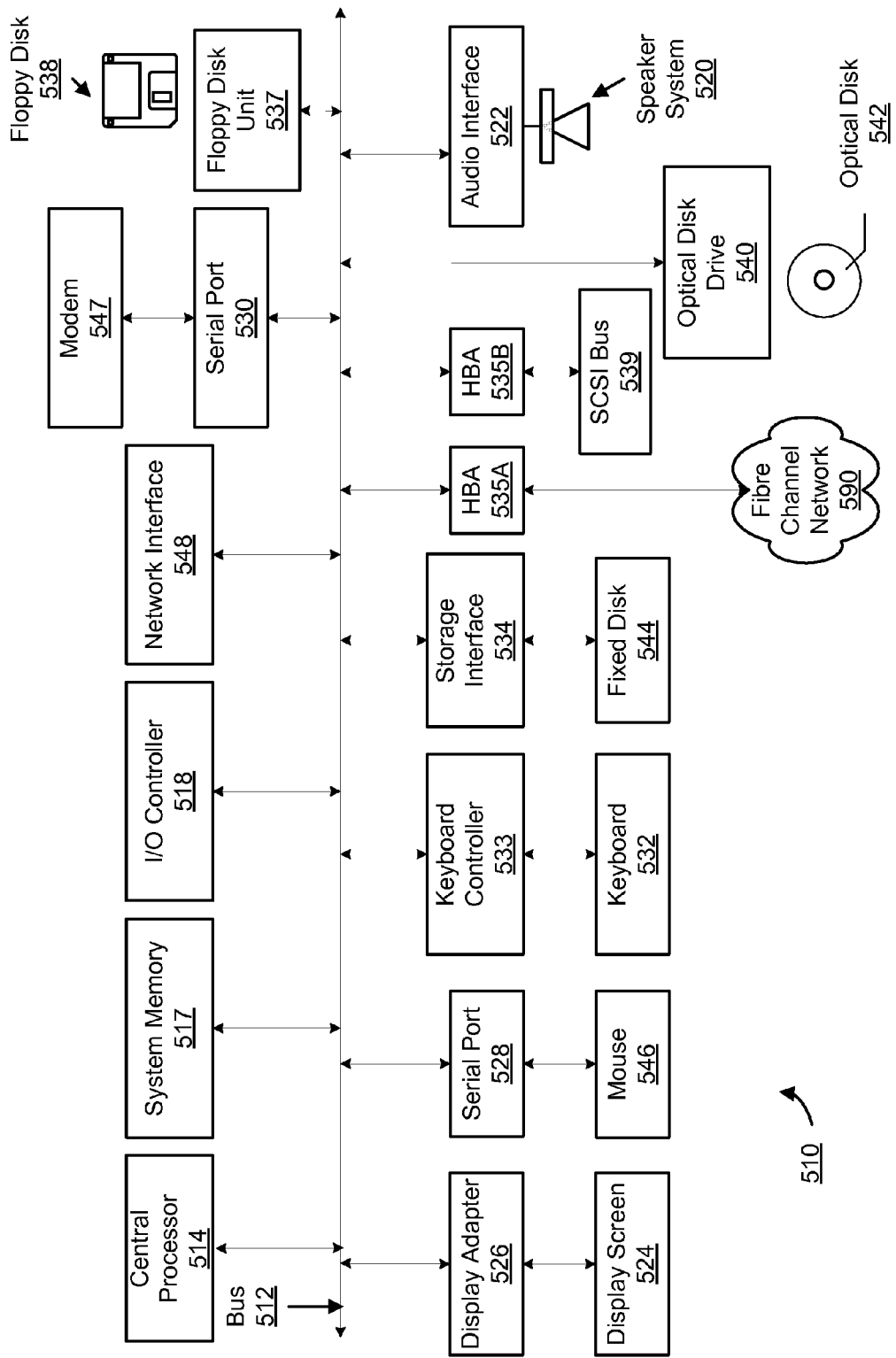
FIG. 5 is a block diagram illustrating components of an example computer system suitable for implementing embodiments of the present disclosure.

FIG. 5 is a block diagram illustrating components of an example computer system suitable for implementing embodiments of the present disclosure. Computer system 510 may be illustrative of various computer systems in the virtualization system 100, such as system(s) 110, 120, 150, 160 and/or 180, among others. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., optical drive 540), a floppy disk unit 537, or other storage medium. Additionally, applications can be in the form of electronic signals modulated in accordance with the application and data communication technology when accessed via network modem 547 or interface 548.

Storage interface 534, as with the other storage interfaces of computer system 510, can connect to a standard computer readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the present disclosure. The devices and subsystems can be interconnected in different ways from that shown in FIG. 5. Code for the automatically performing operations on such applications based on their dependencies on other applications (such as described above with reference to the processes of FIG. 3-4), etc., to implement the present disclosure can be stored in computer-readable storage media such as one or more of system memory 517, fixed disk 544, optical disk 542, or floppy disk 538. Memory 517 is also used for storing temporary variables or other intermediate information during the execution of instructions by the processor 514. The operating system provided on computer system 510 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
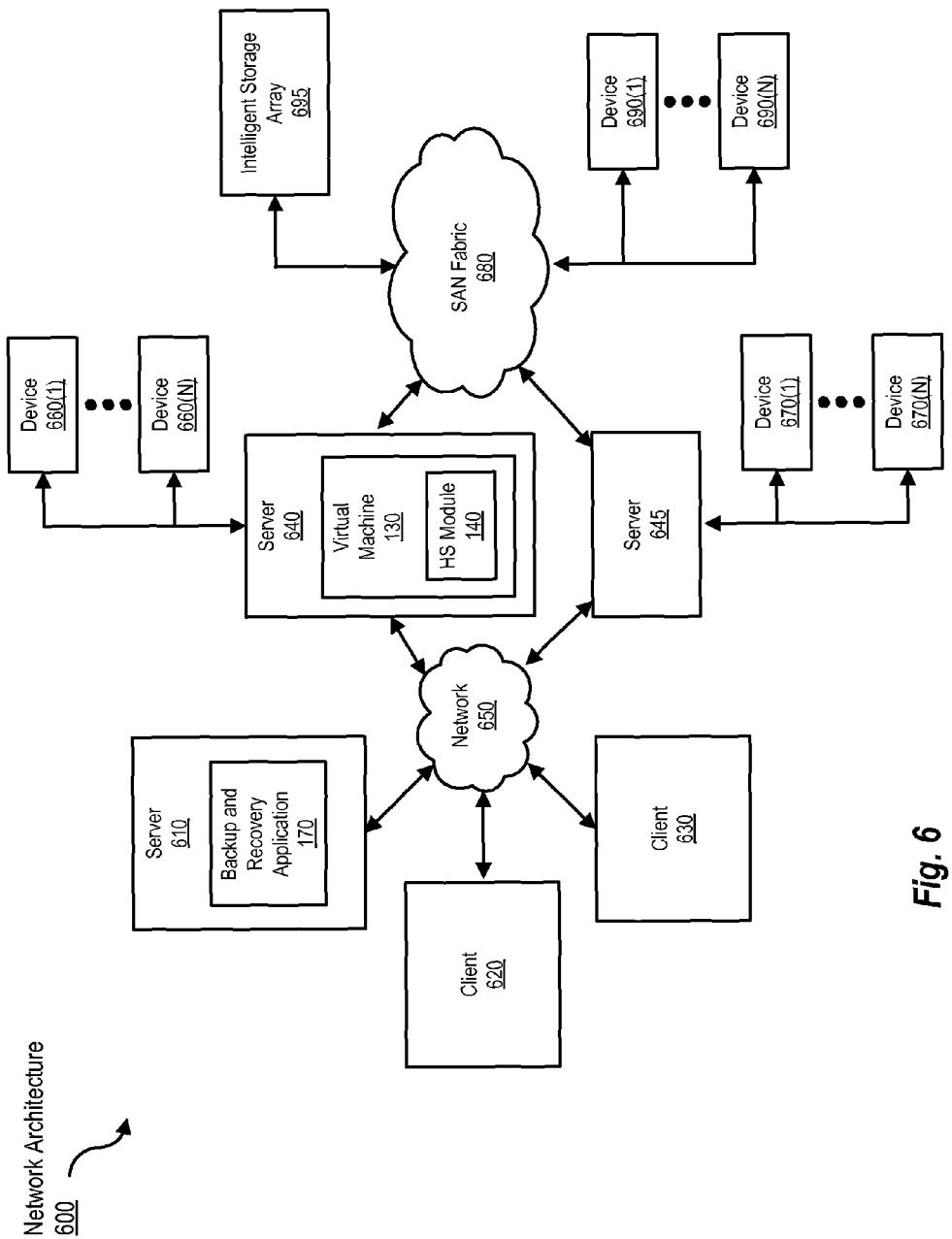
FIG. 6 is a block diagram illustrating components of an example computer system suitable for implementing embodiments of the present disclosure.

FIG. 6 is a block diagram illustrating components of an example network system 600 suitable for implementing embodiments of the present disclosure. Client systems 620 and 630 and servers 610, 640, and 645 can be coupled to a network 650. Client systems 620 and 630 generally represent any type or form of computing device or system, such as client systems 110 in FIG. 1 or computer system 510 in FIG. 5.

Similarly, servers 610, 640, and 645 generally represent computing devices or systems, such as application servers or database servers, configured to provide various database services and/or run certain software applications, such as servers 120, 150, 160 and 180 in FIG. 1 or computer system 510 in FIG. 5. Network 650 generally represents any telecommunication or computer network including, for example, an intranet, a wide area network (WAN), a local area network (LAN), a personal area network (PAN), or the Internet. In one example, client systems 620 and/or 630 and/or servers 610, 640, and/or 645 can include a virtual machine 130 and health services module 140, as shown in FIGS. 1 and 2, and/or a backup and recovery application 170, as shown in FIG. 1.

As illustrated in FIG. 6, one or more storage devices 660(1)-(N) can be directly attached to server 640. Similarly, one or more storage devices 670(1)-(N) can be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) can represent network-attached storage (NAS) devices configured to communicate with servers 640 and 645 using various protocols, such as Network File System (NFS), Server Message Block (SMB), or Common Internet File System (CIFS).

Servers 640 and 645 can also be connected to a storage area network (SAN) fabric 680. SAN fabric 680 generally represents any type or form of computer network or architecture capable of facilitating communication between multiple storage devices. SAN fabric 680 can facilitate communication between servers 640 and 645 and a plurality of storage devices 690(1)-(N) and/or an intelligent storage array 695. SAN fabric 680 can also facilitate, via network 650 and servers 640 and 645, communication between client systems 620 and 630 and storage devices 690(1)-(N) and/or intelligent storage array 695 in such a manner that devices 690(1)-(N) and array 695 appear as locally attached devices to client systems 620 and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computer system 510 of FIG. 5, a communication interface can be used to provide connectivity between each client system 620 and 630 and network 650. Client systems 620 and 630 can be able to access information on server 640 or 645 using, for example, a web browser or other client software. Such software can allow client systems 620 and 630 to access data hosted by server 610, server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 610, server 640, server 645, storage devices 660(1)-(N), storage devices 670(1)-(N), storage devices 690(1)-(N), intelligent storage array 695, or any combination thereof. All or a portion of one or more of the embodiments disclosed herein can also be encoded as a computer program, stored in server 610, run by server 640 and server 645, and distributed to client systems 620 and 630 over network 650.

In some examples, all or a portion of the computing devices in FIGS. 1, 5, and 6 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a health services module 140 in FIG. 1 can transform data retrieved from a database into an application status.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
   restoring a backup image of a virtual machine disk file, wherein the restoring comprises copying the virtual machine disk file to a test environment;
   starting a virtual machine from the backup image of the virtual machine disk file that has been restored; and
   installing a health services module on the virtual machine, in response to a determination that the virtual machine is successfully started in the test environment, wherein
      the health services module is configured to
         test availability of one or more application services of the virtual machine.

2. The method of claim 1, further comprising:
   determining whether a failure indication from the health services module has been received within a timeout period, wherein
      one or more applications are installed on the virtual machine, and
      the failure indication indicates that at least one application of the one or more applications is not available.

3. The method of claim 2, further comprising:
   associating a guarantee of availability with the backup image, in response to a determination that the failure indication has not been received within the timeout period.

4. The method of claim 1, wherein
   each of the one or more application services is respectively provided by an application of one or more applications installed on the virtual machine.

5. The method of claim 4, wherein testing availability of the one or more application services comprises:
   invoking a start procedure of a first application of the one or more applications, wherein
      successful execution of the start procedure results in a first application service running on the virtual machine; and
   invoking a test procedure of the first application service, in response to a determination that the first application service is running on the virtual machine.

6. The method of claim 5, further comprising:
   determining whether the first application service failed to successfully complete the test procedure within a timeout period; and
   providing an indication that the first application service is not available, in response to a determination that the first application service failed to successfully complete the test procedure within the timeout period.

7. The method of claim 1, wherein
   the backup image of the virtual machine disk file corresponds to a single virtual machine.

8. The method of claim 1, wherein the installing the health services module comprises installing a plurality of agents configured to cooperatively implement testing of the one or more application services of the virtual machine.

9. A system, comprising:
   a test server configured to
      restore a backup image of a virtual machine disk file, wherein the restoring comprises copying the virtual machine disk file to the test server, and
      start a virtual machine from the backup image of the virtual machine disk file that has been restored; and
   a health services module configured to
      test availability of one or more application services of the virtual machine, wherein
         the health services module is installed on the virtual machine, in response to a determination that the virtual machine is successfully started on the test server.

10. The system of claim 9, further comprising:
    a backup and recovery application configured to
       determine whether a failure indication from the health services module has been received within a timeout period, wherein
          the failure indication indicates that at least one application service of the one or more application services is not available.

11. The system of claim 10, wherein
    the backup and recovery application is further configured to
       associate a guarantee of availability with the backup image, in response to a determination that the failure indication has not been received within the timeout period.

12. The system of claim 9, wherein
    each of the one or more application services is respectively provided by an application of one or more applications installed on the virtual machine.

13. The system of claim 12, wherein
    the health services module is further configured to
       invoke a start procedure of a first application of the one or more applications, wherein
          successful execution of the start procedure results in a first application service running on the virtual machine; and
       invoke a test procedure of the first application service, in response to a determination that the first application service is running on the virtual machine.

14. The system of claim 13, wherein
    the health services module is further configured to
       determine whether the first application service failed to successfully complete the test procedure within a timeout period; and
       provide an indication that the first application service is not available, in response to a determination that the first application service failed to successfully complete the test procedure within the timeout period.

15. A non-transitory computer readable storage medium configured to store program instructions that, when executed on a processor, are configured to cause the processor to perform operations comprising:
    restoring a backup image of a virtual machine disk file, wherein the restoring comprises copying the virtual machine disk file to a test environment;
    starting a virtual machine from the backup image of the virtual machine disk file that has been restored; and
    installing a health services module on the virtual machine, in response to a determination that the virtual machine is successfully started in the test environment, wherein
       the health services module is configured to
          test availability of one or more application services of the virtual machine.

16. The non-transitory computer readable storage medium of claim 15, wherein the operations further comprise:
   determining whether a failure indication from the health services module has been received within a timeout period, wherein
   one or more applications are installed on the virtual machine, and
   the failure indication indicates that at least one application of the one or more applications is not available.

17. The non-transitory computer readable storage medium of claim 16, wherein the operations further comprise:
   associating a guarantee of availability with the backup image, in response to a determination that the failure indication has not been received within the timeout period.

18. The non-transitory computer readable storage medium of claim 15, wherein
   each of the one or more application services is respectively provided by an application of one or more applications installed on the virtual machine.

19. The non-transitory computer readable storage medium of claim 18, wherein testing availability of the one or more application services comprises:
   invoking a start procedure of a first application of the one or more applications, wherein
   successful execution of the start procedure results in a first application service running on the virtual machine; and
   invoking a test procedure of the first application service, in response to a determination that the first application service is running on the virtual machine.

20. The non-transitory computer readable storage medium of claim 19, wherein the operations further comprise:
   determining whether the first application service failed to successfully complete the test procedure within a timeout period; and
   providing an indication that the first application service is not available, in response to a determination that the first application service failed to successfully complete the test procedure within the timeout period.

\* \* \* \* \*